United States Patent
Morrison et al.

(10) Patent No.: US 7,275,559 B2
(45) Date of Patent: Oct. 2, 2007

(54) PRESSURE CONTROL VALVE

(76) Inventors: Walter G. Morrison, 172 Loralyn Avenue, Sanctuary Point NSW (AU) 2540; Jean H. Morrison, 172 Loralyn Avenue, Sanctuary Point NSW (AU) 2540

( * ) Notice: Subject to any disclaimer, the term of this patent is extended or adjusted under 35 U.S.C. 154(b) by 283 days.

(21) Appl. No.: 10/983,221

(22) Filed: Nov. 5, 2004

(65) Prior Publication Data

US 2005/0152796 A1 Jul. 14, 2005

Related U.S. Application Data

(63) Continuation-in-part of application No. PCT/AU03/00529, filed on May 6, 2003.

(51) Int. Cl.
*G05D 16/02* (2006.01)
(52) U.S. Cl. .................... 137/505.25; 137/505.28
(58) Field of Classification Search ............... 137/12, 137/14 S, 505, 505.25 X, 505.28
See application file for complete search history.

(56) References Cited

U.S. PATENT DOCUMENTS

| | | | |
|---|---|---|---|
| 3,437,109 A | 4/1969 | Carlson et al. | 137/505.25 |
| 3,890,999 A | 6/1975 | Moskow | 137/505.25 |
| 4,027,923 A | 6/1977 | Saito | 303/6 |
| 4,083,380 A | 4/1978 | Huber | 137/505.25 |
| 4,219,045 A * | 8/1980 | Martini | 137/505.25 |
| 4,230,140 A * | 10/1980 | Hart | 137/505.25 |
| 5,129,419 A | 7/1992 | Stapleton | 137/514.3 |
| 5,669,369 A * | 9/1997 | Scott | 137/505.25 |
| 5,678,602 A * | 10/1997 | Cannet et al. | 137/505.25 |
| 5,961,051 A | 10/1999 | Matsui et al. | 239/533.1 |

FOREIGN PATENT DOCUMENTS

| | | |
|---|---|---|
| AU | 62393/86 | 3/1987 |
| AU | 13534/88 | 9/1988 |
| AU | 87913/98 | 5/1999 |
| AU | 21317/99 | 10/1999 |
| CH | 405 851 | 1/1966 |

(Continued)

OTHER PUBLICATIONS

International Search Report in PCT/AU03/00529 dated Sep. 9, 2003.

*Primary Examiner*—Stephen M. Hepperle
(74) *Attorney, Agent, or Firm*—Marshall Gerstein & Borun LLP

(57) ABSTRACT

A pressure control valve is disclosed which includes an inlet; an outlet; a valve body between the inlet and the outlet; a piston having opposed smaller and larger ends each having a circumferentially extending piston wall, the piston being slideably received within the valve body and having a bore therethrough; a porting assembly for providing a fluid passageway between the inlet and the bore, and biasing means for biasing the piston against the pressure at the outlet towards a first position proximate the outlet from a second position proximate the inlet; wherein in the first position fluid communication is made between the inlet and the outlet via the porting assembly and the bore, and in the second position fluid communication between the inlet and the outlet is prevented by the circumferentially extending piston wall of the smaller end of the piston cooperating with the porting assembly to close the fluid passageway between the inlet and the bore.

12 Claims, 4 Drawing Sheets

FOREIGN PATENT DOCUMENTS

| | | |
|---|---|---|
| GB | 1033196 | 6/1966 |
| GB | 1204356 | 9/1970 |
| GB | 1264812 | 2/1972 |
| JP | 11-082781 | 3/1999 |
| WO | WO92/15810 | 9/1992 |
| WO | WO98/08012 | 2/1998 |
| WO | WO 00/43700 | 7/2000 |

* cited by examiner

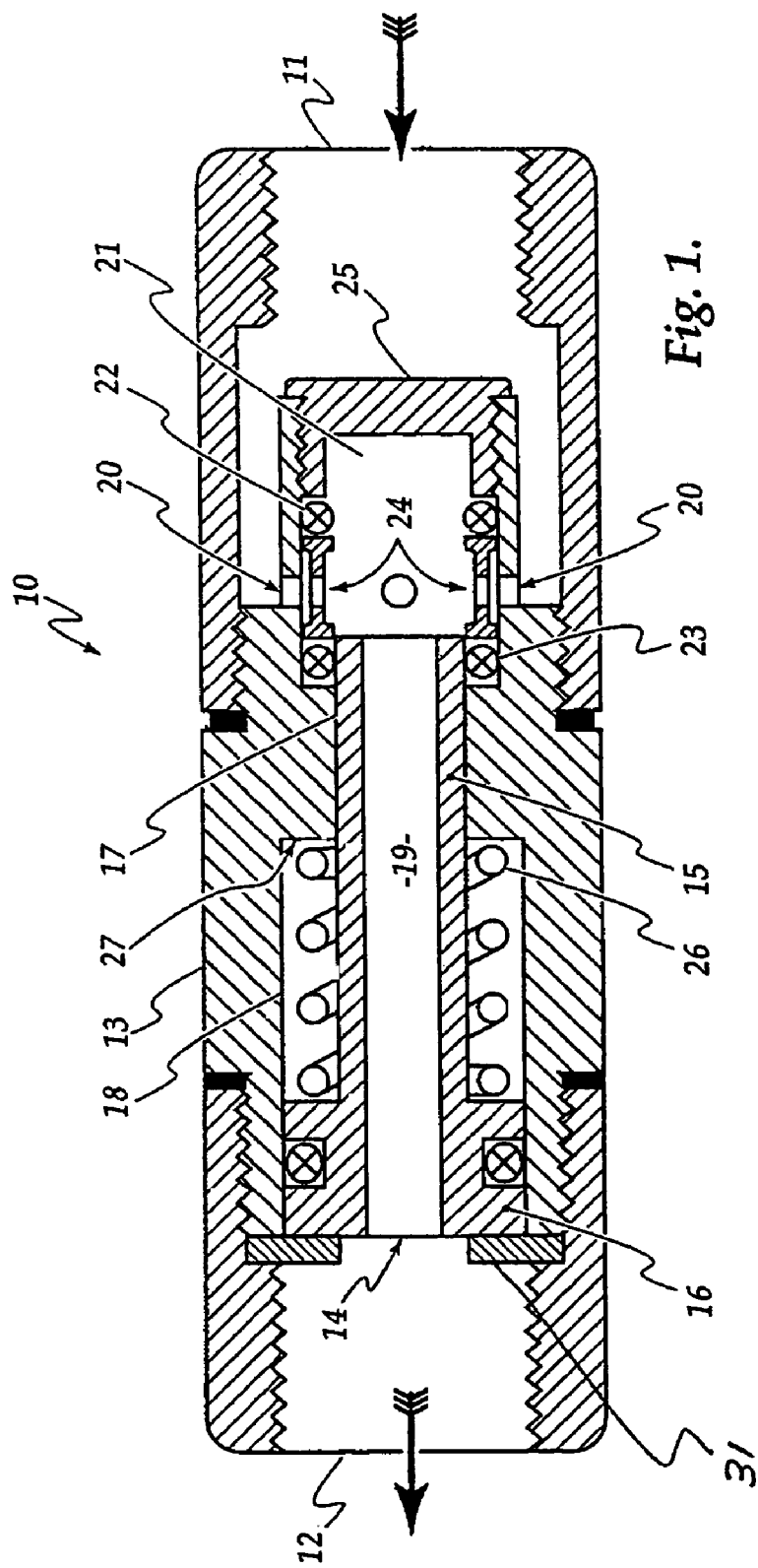
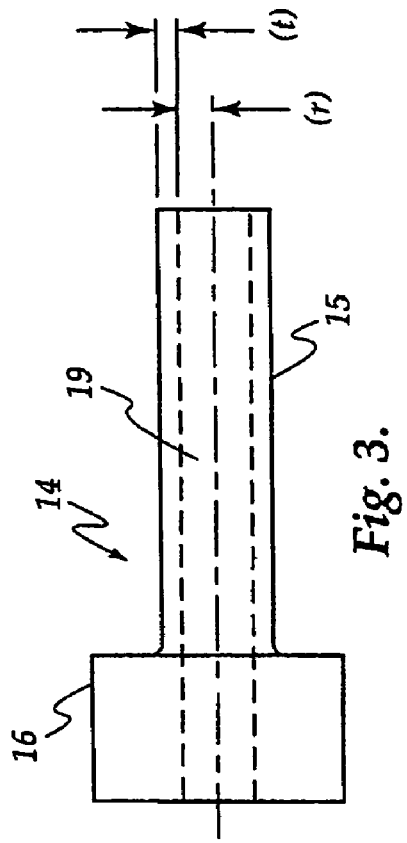
Fig. 1.
Fig. 3.

PRESSURE CONTROL VALVE

CROSS-REFERENCE TO RELATED APPLICATION

This is a continuation-in-part of co-pending International Application No. PCT/AU03/00529 filed May 6, 2003, the entire disclosure of which is incorporated herein by reference.

BACKGROUND

1. Field of the Disclosure

The disclosure relates to a pressure control valve, with particular but not exclusive application to a pressure control valve which delivers a relatively constant pressure at the valve outlet when the pressure at the valve inlet reaches or exceeds the constant output pressure.

2. Related Technology

Pressure control valves are known, as are so-called constant pressure valves which purport to deliver a constant output pressure for varying input pressures. However some known constant pressure valves deliver a constant pressure only within a specified range of varying input pressures. Thus a constant pressure valve which may deliver a relatively constant output pressure of 300 KPA for varying input pressure within a range of from 300-500 KPA, may deliver an output pressure considerably in excess of 300 KPA if the input pressure were to increase to 1000 KPA.

One such valve is the subject of AU patent 602199 wherein outlet pressure is controlled by the biasing effect of a spring acting against a piston the face of which has applied to it the pressure at the valve outlet. The outlet pressure overcomes the force exerted by the spring to move the piston away from the outlet and into engagement with a valve seat proximate the valve inlet to close off a bore extending through the piston for providing fluid communication between the inlet and the outlet.

SUMMARY

The disclosure aims to provide an alternative to known pressure control valves which purport to deliver a constant outlet pressure.

The disclosure in one aspect resides broadly in a pressure control valve including:

an inlet;

an outlet;

a valve body between the inlet and the outlet;

a piston having opposed smaller and larger ends each having a circumferentially extending piston wall, the piston being slideably received within the valve body and having a bore therethrough;

a porting assembly for providing a closable fluid passageway between the inlet and the bore, and biasing means for biasing the piston against the pressure at the outlet towards a first position proximate the outlet from a second position proximate the inlet;

wherein in the first position fluid communication is made between the inlet and the outlet via the porting assembly and the bore, and in the second position fluid communication between the inlet and the outlet is prevented by the circumferentially extending piston wall of the smaller end of the piston cooperating with the porting assembly to close the fluid passageway between the inlet and the bore.

In another aspect the disclosure resides broadly in a method of controlling the outlet pressure of a valve having an inlet, an outlet, a valve body between the inlet and the outlet, a piston having opposed smaller and larger ends and being slideably received within the valve body and having a bore therethrough, and a porting assembly for providing a closable fluid passageway between the inlet and the bore, the method including:

biasing the piston against the pressure at the outlet towards a first position proximate the outlet from a second position proximate the inlet, whereby in the first position fluid communication is made between the inlet and the outlet via the porting assembly and the bore, and in the second position fluid communication between the inlet and the outlet is prevented by the circumferentially extending piston wall of the smaller end of the piston cooperating with the porting assembly to close the fluid passageway between the inlet and the bore.

It is preferred that the larger end of the piston is exposed to the pressure at the outlet.

It is also preferred that the pressure control valve includes a chamber in fluid communication with the inlet via at least one aperture.

It is also preferred that the inlet and outlet comprise respective discrete members releasably connected to the valve body.

The chamber may form part of the valve body, or alternatively the chamber may be formed between the inlet member and the valve body.

It is also preferred that the smaller end of the piston is received within the chamber when in the second position and that the porting assembly includes the at least one aperture and first sealing means for preventing fluid communication between the aperture and the chamber when the piston is in the second position.

It is also preferred that the valve includes second sealing means for preventing fluid communication between the inlet and the outlet other than via the bore.

It is also preferred that the chamber is cylindrical, the fluid communication between the inlet and the chamber is via a plurality of apertures disposed circumferentially about the chamber, and the first and second sealing means respectively include a pair of sealing rings spaced upstream and downstream of the apertures.

In one embodiment is it preferred that the sealing rings are positioned by a lantern ring or the like juxtaposing the apertures.

It is also preferred that the chamber includes a plate member removable therefrom to provide an opening for the positioning of the sealing rings therein.

In another embodiment it is preferred that the first sealing means is supported by a circumferential flange extending into the chamber from the plate member.

It is also preferred that the predetermined pressure is a function of the bias provided by the biasing means.

It is also preferred that the biasing means is a coil spring bearing on a seat on the valve body to bias the piston towards the first position against the action of the outlet pressure.

It is preferred that the spring is replaceable to vary the bias.

BRIEF DESCRIPTION OF THE DRAWINGS

In order that this disclosure may be more easily understood and put into practical effect, reference will now be made to the accompanying drawings which illustrate a preferred embodiment, wherein:

FIG. 1 is a cross-sectional elevation illustrating a preferred embodiment of the pressure control valve in accordance with the disclosure;

FIG. 3 is a representative side view of the piston for the purposes of illustrating a difference between the pressure control valve in accordance with the disclosure and a known pressure control valve;

DETAILED DESCRIPTION

Figure 2A:
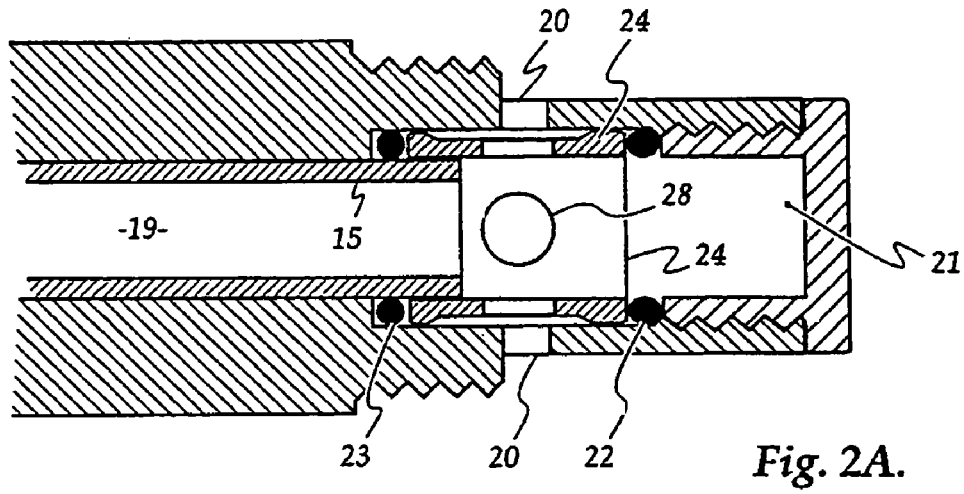
FIGS. 2A, 2B and 2C illustrate the sequential closing of the sealing rings in the chamber proximate the inlet of the pressure control valve seen in FIG. 1.

As is best seen in FIG. 1, pressure control valve 10 has an inlet 11 and an outlet 12 each of which can be screwed to connect to valve body 13 which is located between the inlet 11 and the outlet 12. The piston 14 has opposed smaller and larger ends 15, 16 each having a circumferential surface, the piston being slideably received within the valve body 13 in respective stepped bores 17,18 in the valve body. The piston 14 has a bore 19 extending from one end 15 to the other end 16. As will be subsequently described, a porting assembly having apertures 20 provides a closable fluid passageway between the inlet 15 and the bore 19. Biasing means in the form of a compression spring 26 is seated on a seat 27 in the valve body 13 and biases the piston 14 against the pressure at the outlet 12 towards a first position (as seen in FIG. 1) proximate the outlet 12 from a second position (as seen in FIG. 2C) proximate the inlet 11. In the first position (FIG. 1), fluid communication is established between the inlet 11 and the outlet 12 via the apertures 20 and the bore 19. In the second position (FIG. 2C), fluid communication between the inlet 11 and the outlet 12 is prevented by the circumferentially extending piston wall of the smaller end 15 of piston 14 cooperating with the porting assembly to close the fluid passageway between inlet 11 and bore 19.

Figure 2B:
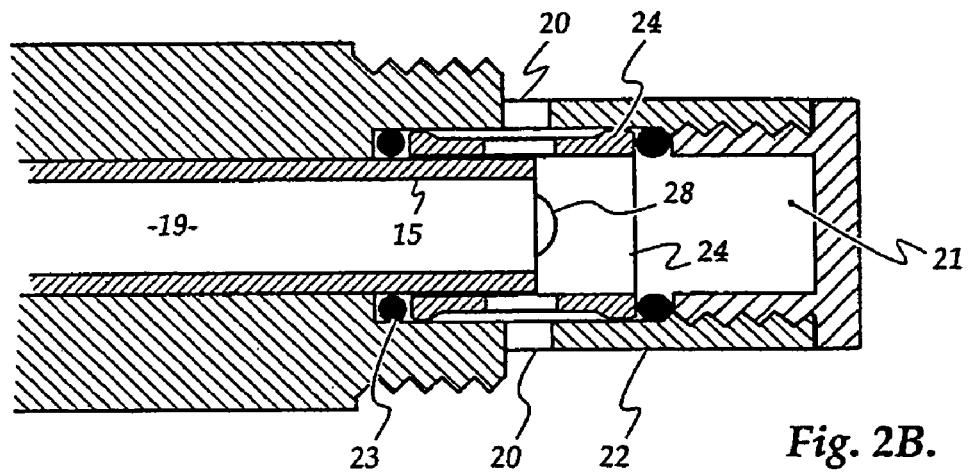
Figure 2C:
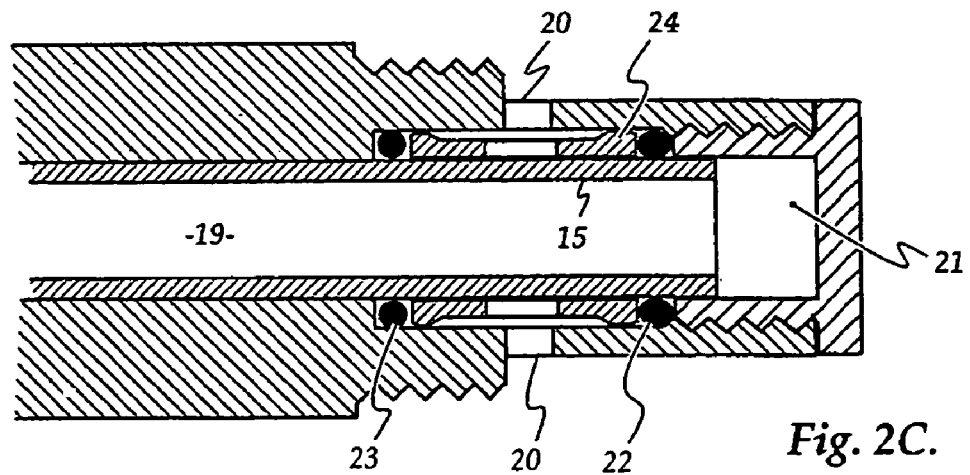

The valve body 13 is formed at one end with a chamber 21 in fluid communication with the inlet 11 via a number of circumferentially disposed apertures 20, and as can be seen sequentially in FIGS. 2A, 2B and 2C, the smaller end 15 of the piston 14 is received within the chamber 21 when in the second position. The porting assembly also includes first sealing means in the form of a sealing ring 22 which, when engaged by the circumferentially extending piston wall of the smaller end 15 of the piston 14, prevents fluid communication between the apertures 20 and the chamber 21 when the piston 14 is in the second position (FIG. 2C). Second sealing means in the form of a sealing ring 23 prevents fluid communication between the inlet 11 and the outlet 12 other than via the bore 19, i.e., it prevents leakage along the stepped bore 17,18 of the valve body 13. The sealing rings 22,23 are held in place within the cylindrical chamber 21 by a lantern ring 24 which is positioned within the chamber 21 by removing a plate member 25 threaded to the end of the chamber and which when re-assembled holds the sealing rings 22,23 and the lantern ring 24 in position within chamber 21 with lantern ring 24 in position juxtaposing the circumferentially disposed apertures 20 and with the sealing rings 22,23 upstream and downstream of the apertures 20 respectively. Apertures 28 in lantern ring 24 are illustrated in FIGS. 2A and 2B and provide a closable fluid passage into the chamber 21 from the apertures 20.

It will thus be appreciated that the pressure control valve 10 includes an inlet 11; an outlet 12; a valve body 13 between the inlet 11 and the outlet 12; a piston 14 having opposed smaller and larger ends 15,16 each having a circumferentially extending piston wall, the piston 14 being slideably received within the valve body 13 and having a bore 19 therethrough; a porting assembly 20,22 for providing a fluid passageway between the inlet 11 and the bore 12, and biasing means 26 for biasing the piston 14 against the pressure at the outlet 12 towards a first position (FIG. 1) proximate the outlet 12 from a second position (FIG. 2C) proximate the inlet 11; wherein in the first position (FIG. 1) fluid communication is made between the inlet 11 and the outlet 12 via the porting assembly 20,22 and the bore 19, and in the second position (FIG. 2C) fluid communication between the inlet 11 and the outlet 12 is prevented by the circumferentially extending piston wall of the smaller end 15 of the piston 14 cooperating with the porting assembly 20,22 to close the fluid passageway between the inlet 11 and the bore 19.

During operation as seen sequentially in FIGS. 2A, 2B and 2C, in the second position (FIG. 2A which corresponds with the position of the piston 14 as illustrated in FIG. 1) with the large end 16 of the piston 14 proximate the outlet 12, the circumferentially extending the piston wall of the small end 16 of the piston 14 engages with the sealing ring 23 downstream of the circumferential apertures 20 to prevent leakage of fluid into the stepped bore 17,18 of the valve body 13 and in this position fluid communication between the inlet 11 and the outlet 12 is via the apertures 20, the chamber 21 and the bore 19. Pressure at the outlet 12 is applied to the face at the large end 16 of the piston 14 and has the effect of moving the piston 14 against the force of the compression spring 26 in the direction of the inlet 11. The interim position of the piston 14 in its movement between the two positions described above is seen in FIG. 2B.

As the piston 14 moves further towards the inlet, the circumferentially extending piston wall of the small end 15 of the piston 14 also engages with the sealing ring 22 upstream of the circumferential apertures 20 to close fluid communication between the apertures 20 and the chamber 21, thereby closing the fluid communication between the inlet 11 and the outlet 12.

In use therefore, the disclosure will be appreciated as providing a method of controlling the outlet pressure at a valve 10 having an inlet 11, an outlet 12, a valve body 13 between the inlet 11 and the outlet 12, a piston 14 having opposed smaller and larger ends 15,16 and being slideably received within the valve body 13 and having a bore 19 therethrough, and a porting assembly 20,22 for providing a closable fluid passageway between the inlet 11 and the bore 19, in which the method includes biasing the piston 14 against the pressure at the outlet 12 towards a first position (FIG. 1) proximate the outlet 12 from a second position (FIG. 2C) proximate the inlet 11, whereby in the first position fluid communication is made between the inlet 11 and the outlet 12 via the porting assembly 20,22 and the bore 19, and in the second position fluid communication between the inlet 11 and the outlet 12 is prevented by the circumferentially extending piston wall of the smaller end 15 of the piston 14 cooperating with the porting assembly 20,22 to close the fluid passageway between the inlet 11 and the bore 19.

The previous explanation of the operation of the valve controlling the pressure at the outlet has not made reference to the effect caused by the pressure acting on the face area of the piston at the inlet end. An analysis of this effect and its significance in relation to the disclosure will now be provided with brief reference to FIG. 3 which is a side view of piston 14 showing the respective faces of the larger and smaller ends 16,15 and the bore 19 being shown in dotted outline, with the radius of the bore 19 being (r) and the radius of the smaller end 15 being (r+t) where (t) is the thickness of the wall of the smaller end 15 of the piston 14.

It will be appreciated that the piston 14 is in effect a differential piston and that although the respective areas of the faces of the larger end of the piston and the smaller end are considerably different, the pressure of the fluid acting on the face of the smaller end 15 will generate a force which combines with the force exerted by the spring 26 in overcoming the opposing force generated in the opposite direction by the pressure at the outlet acting on the face of the larger end 16 of the piston 14.

In general terms with respect to a valve of this type, when fluid communication between inlet and outlet is interrupted by closure of the fluid path upon movement of the piston towards the inlet away from the outlet, the forces which to that point have been overcome by the force generated by the outlet pressure acting on the face of the larger (ie the combined force generated by the spring and by the inlet pressure acting on face of the small end), is suddenly reduced to the force generated by the spring alone.

Thus as seen in FIG. 3, this differential force (F) is equal to the inlet pressure (P) multiplied by the area of the smaller end 15 of piston 14 $[\pi(r+t)^2 - \pi r^2]$ in accordance with the equation $$F = P[\pi(r+t)^2 - \pi r^2]$$
$$= P\pi(2rt + t^2)$$

This variation in the force which counters that generated on the face of the larger piston end 16 can have an effect on the stability of the outlet pressure, both in terms of its constancy and also, if the force F above is sufficiently large, in terms of valve chatter or stutter. In other words, the larger the force F, the less stable the outlet pressure and the greater the likelihood of valve chatter. Put differently, for a given inlet pressure and piston bore diameter, the smaller the wall thickness of the tube constituting the smaller end of the piston, the more constant the outlet pressure and the less likely that the valve will chatter.

It will therefore be readily appreciated that the disclosed valve of has some distinct advantages over known valves and particularly over the valve disclosed in AU patent 602199. In order to provide effective closure in a valving arrangement where sealing is provided by a tube abutting a valve seat, it is important that the wall of the tube have sufficient thickness to prevent leakage across the width when the valve seat is engaged. Moreover, the wall must be relatively thick to prevent the valve seat wearing out after relatively little usage. On the other hand, in the present invention where the closure is provided by the sliding action of the periphery of the tube engaging a surrounding sealing ring, the above limitations imposed on the thickness of the tube do not apply.

This is of considerable significance because the force F as calculated in the equation above is subject to a square law. Typically in a valving arrangement as illustrated in AU 602199, for an inlet pressure of about 300 KPA, and a valve with a piston having a bore of 10 mm diameter, the wall thickness must be at least 2-3 mm to provide an effective seal on the seat and to prevent rapid wear of that seat. By way of contrast, the wall thickness in the disclosed is limited only by the requirement for the wall to withstand the inlet pressure and for similar dimensions as referred to above, the wall thickness need be no more than 0.5 mm. A Valve having a 10 mm bore with a wall thickness of 0.5 mm at the smaller end of the piston will have a pressure differential F which is 4.57 less than that of the same valve with a wall thickness of 2 mm. This comparative factor will increase to 7.43 if the wall thickness increases to 3 mm. Should the wall thickness in accordance with the disclosed be as low as 0.3 mm, the relative comparative factors increase from 4.57 to 7.77 for the disclosed compared with a 2 mm wall thickness, and from 7.43 to 12.62 when compared with a 3 mm wall thickness.

Furthermore, the wear on the sealing ring seal is considerably less than the wear on the valve seat, leading to longer valve life.

Furthermore, ease of assembly is greatly facilitated by the simple method in the disclosed of accessing the chamber in which the sealing rings are located, by means of the removable end plate, thereby leading to enhanced ease of manufacture and reduced cost.

The embodiment illustrated in FIG. 4 corresponds substantially with that described with reference to FIGS. 1 to 2 with a number of modifications as follows. The rings 23 are replaced with V rings 30, the upstream V ring being kept in place by the pressure of inlet fluid within the cup of the V ring.

Figure 4:
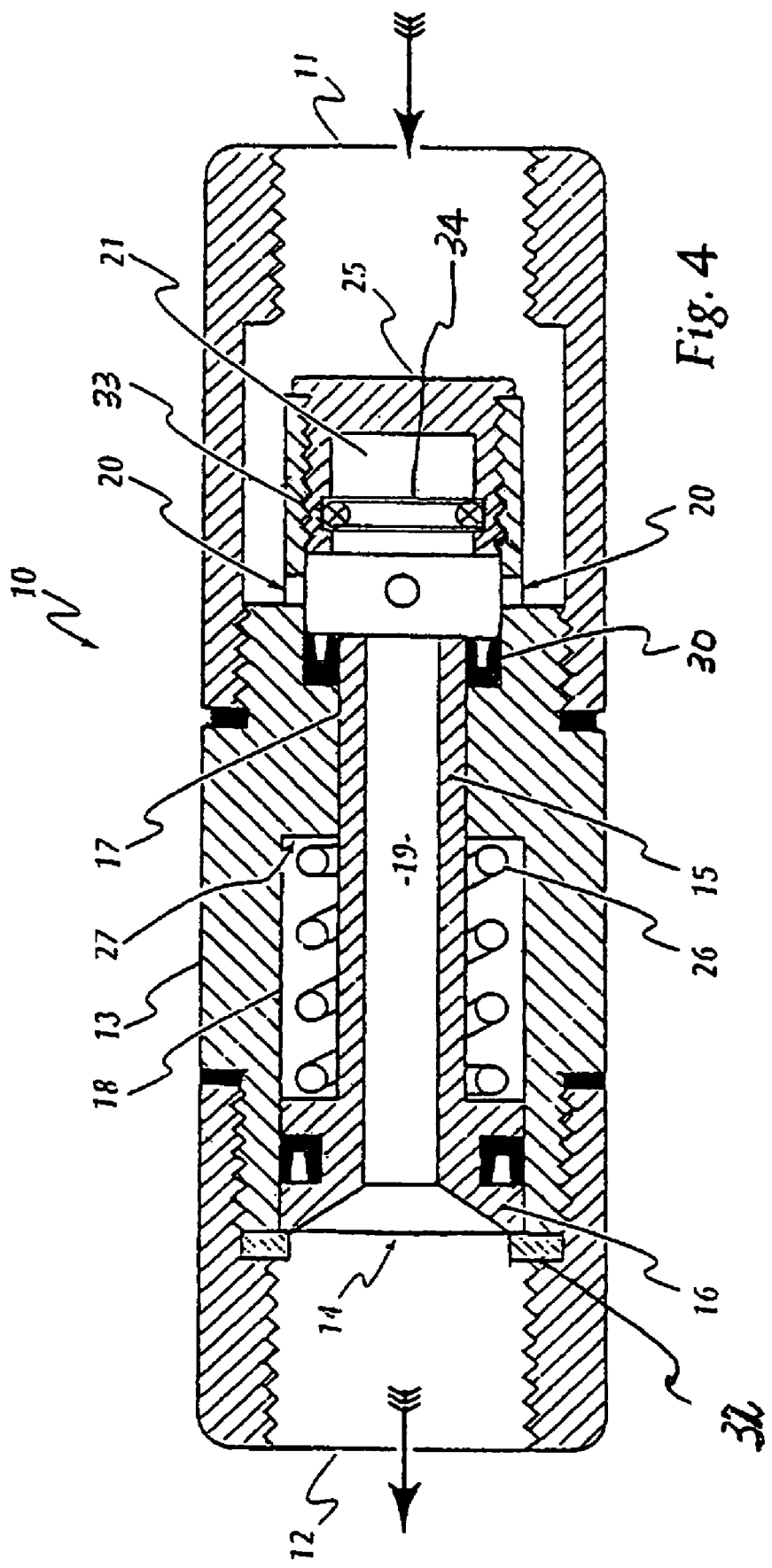
FIG. 4 is a cross-sectional elevation illustrating another preferred embodiment of the pressure control valve in accordance with the disclosure.

The larger end 16 of the piston 14 is chamfered as shown in FIG. 4 thereby allowing outlet pressure to react on a larger portion of the endface 16 if a piston stop 31 of the same size as that shown in FIG. 1 is utilized. Alternatively, a piston stop 32 of smaller width as shown in FIG. 4 can be utilized.

More significantly, in the preferred embodiment of FIG. 4, a lantern ring 24 as seen in FIG. 1 is not utilized. Rather an O ring 33 (functionally equivalent to O ring 22 in FIG. 1) is mounted in a cradle 34 and positioned in the interior wall of the threaded section of a plate member 25. This is a more simple and cost effective arrangement than that illustrated in FIG. 1.

Figure 5:
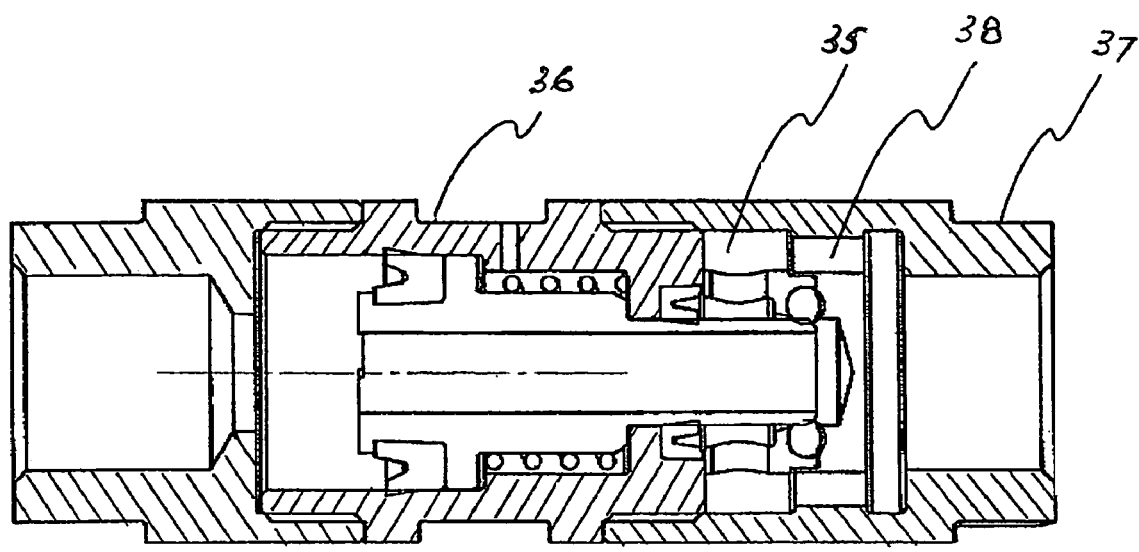
FIG. 5 is a cross-sectional elevation illustrating a further preferred embodiment of the pressure control valve in accordance with the disclosure.
Figure 6:
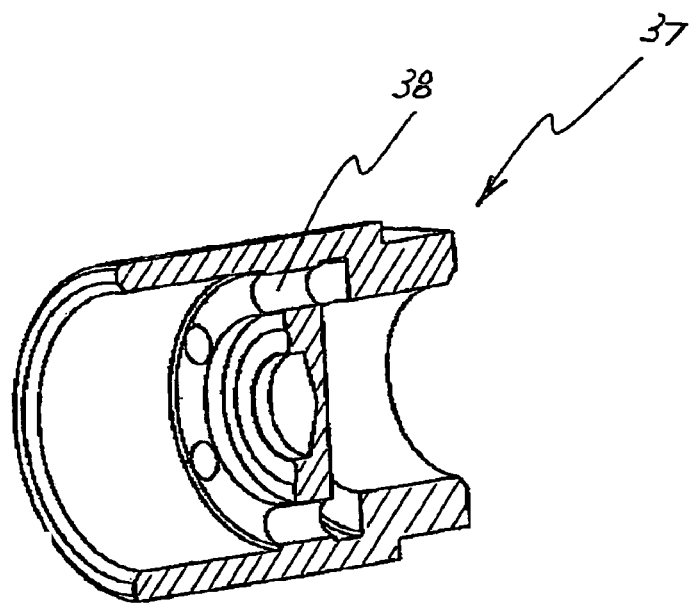
FIG. 6 is a cut-away cross sectional perspective view of the inlet used in the valve shown in FIG. 5.

In the embodiment seen in FIGS. 5 and 6 the configuration of the inlet and the valve body is changed so that a chamber is formed therebetween when connected, rather than the chamber forming a part of the valve body per se as seen in the previously shown embodiments. Thus chamber 35 is formed when an inlet 37 is fitted to a valve body 36, and apertures 38 which are circumferentially disposed around the chamber as best seen in FIG. 6 are axially aligned rather than radially as with the apertures 20.

It will of course be realized that while the previous has been given by way of an illustrative example, all such and other modifications and variations hereto, as would be apparent to persons skilled in the art, are deemed to fall within the broad scope and ambit of this disclosure as is herein set forth.

The invention claimed is:
1. A pressure control valve including:
an inlet;
an outlet;
a valve body between the inlet and the outlet;

a chamber in fluid communication with the inlet via at least one aperture, the chamber being formed by connection of the inlet to the valve body;

a piston having opposed smaller and larger ends each having a circumferentially extending piston wall, the piston being slidably received within the valve body and having a bore therethrough;

a porting assembly for providing a closable fluid passageway between the inlet and the bore, the porting assembly including a first seal adapted to engage the circumferentially extending piston wall of the smaller end of the piston, and biasing means for biasing the piston against the pressure at the outlet towards a first position proximate the outlet from a second position proximate the inlet;

wherein in the first position fluid communication is made between the inlet and the outlet via the porting assembly and the bore, and in the second position fluid communication between the inlet and the outlet is prevented by the circumferentially extending piston wall of the smaller end of the piston slidably engaging the first seal of the porting assembly to close the fluid passageway between the inlet and the bore.

2. A pressure control valve as claimed in claim 1, wherein the larger end of the piston is exposed to the pressure at the outlet.

3. A pressure control valve as claimed in claim 1, wherein the inlet and outlet comprise respective discrete members releasably connected to the valve body.

4. A pressure control valve as claimed in claim 1, wherein the smaller end of the piston is received within the chamber when in the second position and the porting assembly includes the at least one aperture and the first seal is slidably engaged by the circumferentially extending piston wall of the smaller end of the piston for preventing fluid communication between the aperture and the chamber when the piston is in the second position.

5. A pressure control valve as claimed in claim 4, and including a second seal for preventing fluid communication between the inlet and the outlet other than via the bore.

6. A pressure control valve as claimed in claim 5, wherein the chamber is cylindrical, the fluid communication between the inlet and the chamber is via a plurality of apertures disposed circumferentially about the chamber, and the first and second seals respectively include a pair of sealing rings spaced upstream and downstream of the apertures.

7. A pressure control valve as claimed in claim 6, wherein the sealing rings are positioned by a lantern ring juxtaposing the apertures.

8. A pressure control valve as claimed in claim 7, wherein the chamber includes a plate removable therefrom to provide an opening for the positioning of the sealing rings therein.

9. A pressure control valve as claimed in claim 8, wherein the first seal is supported by a circumferential flange extending into the chamber from the plate member.

10. A pressure control valve as claimed in claim 1, wherein the outlet pressure is a function of the bias provided by a biasing means.

11. A pressure control valve as claimed in claim 10, wherein the biasing means is a coil spring bearing on a seat on the valve body to bias the piston towards the first position against the action of the outlet pressure.

12. A pressure control valve as claimed in claim 11, wherein the spring is replaceable to vary the bias.

* * * * *